United States Patent
Kim et al.

(10) Patent No.: US 9,252,852 B2
(45) Date of Patent: Feb. 2, 2016

(54) METHOD FOR TRANSMITTING FEEDBACK BY USING CODEBOOK IN WIRELESS COMMUNICATION SYSTEM AND APPARATUS FOR SAME

(71) Applicant: LG ELECTRONICS INC., Seoul (KR)

(72) Inventors: Hyungtae Kim, Anyang-si (KR); Jonghyun Park, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/409,372

(22) PCT Filed: Jul. 9, 2013

(86) PCT No.: PCT/KR2013/006089
§ 371 (c)(1),
(2) Date: Dec. 18, 2014

(87) PCT Pub. No.: WO2014/010912
PCT Pub. Date: Jan. 16, 2014

(65) Prior Publication Data
US 2015/0180557 A1 Jun. 25, 2015

Related U.S. Application Data

(60) Provisional application No. 61/669,649, filed on Jul. 9, 2012.

(51) Int. Cl.
*H04B 7/04* (2006.01)
*H04L 25/03* (2006.01)

(52) U.S. Cl.
CPC .............. *H04B 7/0417* (2013.01); *H04B 7/046* (2013.01); *H04B 7/0421* (2013.01); *H04B 7/0456* (2013.01); *H04B 7/0469* (2013.01); *H04L 25/03898* (2013.01)

(58) Field of Classification Search
CPC .............. H04L 7/0079; H04L 25/0204; H04L 25/0228; H04L 25/0206; H04B 7/08; H04B 7/0894; H04B 7/0871; H04B 7/0413
USPC ................. 375/267, 260, 262, 259, 295, 316; 370/252, 329, 342
See application file for complete search history.

(56) References Cited

U.S. PATENT DOCUMENTS

2008/0063116 A1 3/2008 Yokoyama
2008/0303699 A1 12/2008 Zhang et al.
(Continued)

FOREIGN PATENT DOCUMENTS

KR 10-2011-0093565 A 8/2011
KR 10-2012-0044530 A 5/2012

*Primary Examiner* — Dhaval Patel
(74) *Attorney, Agent, or Firm* — Birch, Stewart, Kolasch & Birch, LLP

(57) ABSTRACT

The present invention relates to a method for a transmission end transmitting a feedback by using a codebook in a wireless communication system, which supports a multiple antennas, comprising the steps of: determining a first codeword for a first horizontal antenna group from a first codebook, which comprises at least one precoding matrix and is selected for a plurality of horizontal antenna groups from a predetermined codebook; determining a second codeword for a second horizontal antenna group; determining a third codeword for each of the antenna groups other than the first and second horizontal antenna groups, from the plurality of horizontal antenna groups; and providing a feedback of at least one of first, second and third codewords to a receiving end, wherein the third codeword is determined according to a phase increase value, which is determined in accordance with the first and second codewords.

13 Claims, 10 Drawing Sheets

(56) References Cited

U.S. PATENT DOCUMENTS

| | | |
|---|---|---|
| 2009/0041150 A1 | 2/2009 | Tsai et al. |
| 2009/0232245 A1* | 9/2009 | Lakkis .......................... 375/267 |
| 2010/0177653 A1* | 7/2010 | Luo et al. ...................... 370/252 |
| 2011/0194631 A1 | 8/2011 | Clerckx et al. |
| 2011/0249656 A1* | 10/2011 | Cai et al. ....................... 370/336 |
| 2011/0268207 A1* | 11/2011 | Choi et al. ..................... 375/267 |
| 2012/0106470 A1* | 5/2012 | Clerckx et al. ................ 370/329 |

* cited by examiner (a)

(b)

(c)

<Tx Antenna pannel>

METHOD FOR TRANSMITTING FEEDBACK BY USING CODEBOOK IN WIRELESS COMMUNICATION SYSTEM AND APPARATUS FOR SAME

CROSS REFERENCE TO RELATED APPLICATIONS

This application is the National Phase of PCT/KR2013/006089 filed on Jul. 9, 2013, which claims priority under 35 U.S.C. 119(e) to U.S. Provisional Application No. 61/669,649 filed on Jul. 9, 2012, all of which are hereby expressly incorporated by reference into the present application.

TECHNICAL FIELD

The present invention relates to a wireless communication system and, more specifically, to a method for transmitting feedback using a codebook in a wireless communication and an apparatus for the same.

BACKGROUND ART

MIMO (multiple input multiple output) refers to a method for improving transmission/reception data efficiency using a plurality of transmit (Tx) antenna and a plurality of receive (Rx) antennas instead of a single Tx antenna and a single Rx antenna. That is, MIMO is a scheme in which a transmitting end or a receiving end of a wireless communication system improves capacity or enhances performance using multiple antennas. MIMO may be referred to as multi-antenna technology.

To support multi-antenna transmission, a precoding matrix for appropriately distributing transmission information to antenna s according to channel state can be applied. 3GPP LTE ($3^{rd}$ Generation Partnership Project Long Term Evolution) supports a maximum of 4 Tx antennas for downlink transmission and defines a precoding codebook for downlink transmission using the Tx antennas.

In a MIMO based cellular communication environment, data transfer rate can be improved through beamforming between a transmitting end and a receiving end. Whether beamforming is applied is determined based on channel information, a channel estimated through a reference signal at the receiving end is appropriately quantized using a codebook and fed back to the transmitting end.

A description will be given of a spatial channel matrix (or channel matrix) which can be used to generate a codebook. The spatial channel matrix (or channel matrix) can be represented as follows.

$$H(i,k) = \begin{bmatrix} h_{1,1}(i,k) & h_{1,2}(i,k) & \cdots & h_{1,Nt}(i,k) \\ h_{2,1}(i,k) & h_{2,2}(i,k) & \cdots & h_{2,Nt}(i,k) \\ \vdots & \vdots & \ddots & \vdots \\ h_{Nr,1}(i,k) & h_{Nr,2}(i,k) & \cdots & h_{Nr,Nt}(i,k) \end{bmatrix}$$

Here, H(i,k) represents a spatial channel matrix, $N_r$ denotes the number of Rx antennas, $N_t$ denotes the number of Tx antennas, r is an Rx antenna index, t is a Tx antenna index, i represents an OFDM (or SC-FDMA) symbol index and k represents a subcarrier index.

$h_{r,t}(i,k)$ is an element of the channel matrix H(i,k) and represents an r-th channel state and a t-th antenna corresponding to an i-th symbol and k-th subcarrier.

In addition, a spatial channel covariance matrix which can be used in the present invention will now be briefly described. The spatial channel covariance matrix can be represented by R.

$$R = E[H_{i,k}^H \ H_{i,k}]$$

where H denotes a spatial channel matrix and R denotes a spatial channel covariance matrix. In addition, E[ ] represents the mean, i represents a symbol index and k represents a frequency index.

Singular value decomposition (SVD) is a method for decomposing a rectangular matrix, which is widely used in signal processing and statistics. SVD is to normalize matrix spectrum theory for an arbitrary rectangular matrix. An orthogonal square matrix can be decomposed into diagonal matrices using an Eigen value as a basis using spectrum theory. When it is assumed that the channel matrix H is an m×n matrix composed of a plurality of set elements, the matrix H can be represented as a product of three matrices as follows.

$$H_{m \times n} = U_{m \times n} \Sigma_{m \times n} V_{n \times n}^H$$

Here, U and V represent unitary matrices and Σ denotes an m×n matrix including a non-zero singular value. The singular value is $\Sigma = \text{diag}(\sigma_1 \ldots \sigma_r)$, $\sigma_i = \sqrt{\lambda_i}$. Representation as a product of three matrices is referred to as SVD. SVD can handle normal matrices, compared to Eigen value decomposition which can decompose only orthogonal square matrices. SVD and Eigen value composition are related to each other.

When the matrix H is a positive definite Hermitian matrix, all Eigen values of H are non-negative real numbers. Here, singular values and singular vectors of H are equal to Eigen values and Eigen vectors of H. Eigen value decomposition (EVD) can be represented as follows (here, Eigen values may be $\lambda_1, \ldots, \lambda_r$).

$$HH^H = (U\Sigma V^H)(U\Sigma V^H)^H = U\Sigma\Sigma^T U^H$$

$$H^H H = (U\Sigma V^H)^H (U\Sigma V^H) = V\Sigma^T \Sigma V$$

Here, Eigen values can be $\lambda_1, \ldots, \lambda_r$. Information on U between U and V, which indicate channel directions, can be known through singular value decomposition of $HH^H$ and information on V can be known through singular value decomposition of $H^H H$. In general, a transmitting end and a receiving end respectively perform beamforming in order to achieve higher throughput in multi-user MIMO (MU-MIMO). When a receiving end beam and a transmitting end beam are represented by matrices T and W, a channel to which beamforming is applied is indicated by THW=TU(Σ)VW. Accordingly, it is desirable to generate the receiving end beam on the basis of U and to generate the transmitting end beam on the basis of V in order to accomplish higher throughput.

In design of a codebook, it is necessary to reduce feedback overhead using as few bits as possible and to correctly quantize a channel to obtain a sufficient beamforming gain. One of codebook design schemes presented or adopted as a standard by recent mobile communication systems, such as 3GPP LTE (3rd Generation Partnership Project Long Term Evolution), LTE-Advanced and IEEE 16m, is to transform a codebook using a long-term covariance matrix of a channel, as represented by Equation 1.

$$W' = \text{norm}(RW) \quad [\text{Equation 1}]$$

Here, W denotes an existing codebook generated to reflect short-term channel information, R denotes a long-term covariance matrix of channel matrix H, norm(A) represents a matrix in which norm is normalized into 1 per column of matrix A, and W' represents a final codebook generated by transforming the codebook W using the channel matrix H, the long-term covariance matrix R of the channel matrix H and a norm function.

The long-term covariance matrix R of the channel matrix H can be represented as Equation 2.

$$R = E[H^H H] = V\Lambda V^H = \sum_{i=1}^{Nt} \sigma_i v_i v_i^H \quad \text{[Equation 2]}$$

Here, the long-term covariance matrix R of the channel matrix H is decomposed into $V\Lambda V^H$ according to singular value decomposition. V is an Nt×Nt unitary matrix having $V_i$ as an i-th column vector, $\Lambda$ is a diagonal matrix having $\sigma_i$ as an i-th diagonal component and $V^H$ is a Hermitian matrix of V. In addition, $\sigma_i$ and $V_i$ respectively denote an i-th singular value and an i-th singular column vector corresponding thereto ($\sigma_1 \geq \sigma_2 \geq \ldots \geq \sigma_{Nt}$).

DISCLOSURE

Technical Problem

An object of the present invention devised to solve the problem lies in a method for transmitting feedback using a codebook in a wireless communication and an apparatus for the same.

The technical problems solved by the present invention are not limited to the above technical problems and those skilled in the art may understand other technical problems from the following description.

Technical Solution

In an aspect of the present invention, a method for transmitting, by a transmitting end, a feedback using a codebook in a wireless communication system supporting a multi-dimensional antenna, includes: determining a first codeword for a first horizontal antenna group, from a first codebook including at least one precoding matrix and selected for a plurality of horizontal antenna groups from prestored codebooks; determining a second codeword for a second horizontal antenna group; determining a third codeword for each of antenna groups other than the first and second horizontal antenna groups, from among the plurality of horizontal antenna groups; and feeding back at least one of the first, second and third codewords to a receiving end, wherein the third codeword is determined according to a phase increment value determined on the basis of the first and second codewords.

The second codeword and the third codeword may be determined from a precoding matrix corresponding to all channels between the multi-dimensional antenna and the receiving end.

The second codeword may be selected from the first codebook and the third codeword may be determined from a precoding matrix corresponding to all channels between the plurality of horizontal antenna groups and the receiving end.

The first codebook may include all precoding matrices included in the prestored codebooks, and the second codeword and the third codeword may be determined from the first codebook.

The second codeword and the third codeword may be determined from the first codebook.

The method may further include signaling a phase parameter, wherein the second codeword is determined by the phase parameter.

The wireless communication system may support multiple ranks, wherein third codewords for the multiple ranks are determined such that the third codewords are mutually orthogonal.

The first, second and third codewords may be precoding matrix indices (PMIs).

The first, second and third codewords may be independently fed back. The first, second and third codewords may be fed back in different periods.

The precoding matrix may be composed of a discrete Fourier transform (DFT) vector.

In another aspect of the present invention, provided herein is a method for transmitting, by a transmitting end, a feedback using a codebook in a wireless communication system supporting a multi-dimensional cross-pole antenna, including: determining a first codeword for a first horizontal antenna group, from a first codebook including at least one precoding matrix and selected for a plurality of horizontal antenna groups from prestored codebooks; determining a second codeword for a second horizontal antenna group; determining a third codeword for each of antenna groups other than the first and second horizontal antenna groups, from among the plurality of horizontal antenna groups; determining a fourth codeword indicating a phase difference between a first polarization group and a second polarization group in the plurality of horizontal antenna groups; and feeding back at least one of the first, second, third and fourth codewords to a receiving end, wherein the first polarization group and the second polarization group have different polarizations, and the third codeword is determined according to a phase increment value determined on the basis of the first and second codewords.

Advantageous Effects

According to embodiments of the present invention, it is possible to provide a method for transmitting feedback using a codebook capable of efficiently supporting MIMO transmission in a wireless communication system and an apparatus for the same.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that 3GPP LTE mobile communication systems are used. However, the description is applicable to any other mobile communication system except for specific features inherent to the 3GPP LTE systems.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a user equipment (UE) is assumed to refer to a mobile or fixed user end device such as a mobile station (MS), an advanced mobile station (AMS), etc. The term "base station (BS)" is assumed to refer to any node of a network end, such as a Node B, eNode B, an access point (AP), etc., communicating with a UE. While the following description is based on 3GPP LTE and LTE-A, the present invention is applicable to other communication systems.

In a mobile communication system, a UE may receive information from a BS on downlink and transmit information to the BS on uplink. The information that the UE transmits or receives includes data and various types of control information. There are many physical channels according to the types and usages of information that the UE transmits or receives.

A description will be given of 3GPP LTE (3$^{rd}$ Generation Partnership Project Long Term Evolution) (referred to as LTE hereinafter) and LTE-Advanced (referred to as LTE-A hereinafter) systems as exemplary mobile communication systems to which the present invention is applicable.

Figure 1:
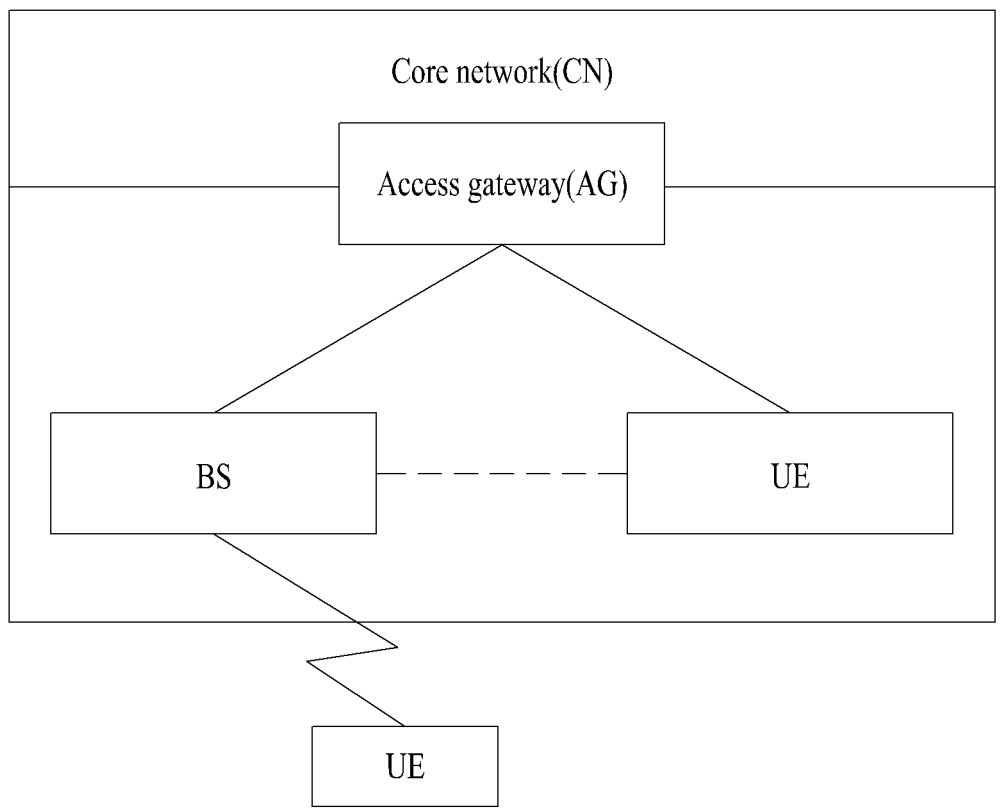
FIG. 1 illustrates E-UMTS network architecture as an exemplary mobile communication system.

FIG. 1 illustrates E-UMTS (Evolved Universal Mobile Telecommunication System) network architecture as an exemplary mobile communication system.

E-UMTS, which evolves from UMTS (Universal Mobile Telecommunication System), is under standardization according to 3GPP. E-UMTS may be regarded as an LTE system. Technical specification of UMTS and E-UMTS refers to Release 7 and Release 8 of "3$^{rd}$ Generation Partnership Project: Technical Specification Group Radio Access Network".

Referring to FIG. 1, E-UMTS includes a user equipment (UE), en eNB and an access gateway (AG) located at the end of a network (E-UTRAN) and connected to an external network. The eNB can simultaneously transmit multiple data streams for broadcast service, multicast service and/or unicast service.

One or more cells are present in one eNB. A cell is set to one of bandwidths of 1.25, 2.5, 5, 10, 15 and 20 MHz and provides downlink or uplink transmission service to multiple UEs. Different cells may be configured to provide different bandwidths. The eNB controls data transmission/reception with respect to a plurality of UEs. The eNB transmits downlink scheduling information about downlink data to a corresponding UE to inform the UE of a time/frequency region used to transmit the data, coding information, data size, hybrid automatic repeat and request (HARQ) related information, etc.

In addition, the eNB transmits uplink scheduling information about uplink data to a corresponding UE to notify the UE of a time/frequency region that can be used by the UE, coding information, data size, HARQ related information, etc. An interface for user traffic or control traffic transmission may be used between eNBs. A core network (CN) may be composed of the AG and a network node for user registration of the UE. The AG manages UE mobility per TA (tracking area) including a plurality of cells.

While wireless communication technology has been developed to LTE on the basis of wideband code division multiple access (WCDMA), demands and expectations of users and carriers steadily increase. Furthermore, technical evolution in wireless communication technology is required to have competitiveness since other wireless access techniques are being developed. That is, decrease in cost per bit, service availability increase, use of flexible frequency band, simple architecture and open interface, adequate power consumption of UEs, etc. are needed.

Recently, 3GPP has standardized technology subsequent to LTE. This is referred to as "LTE-A" in the specification. A main difference between LTE and LTE-A is a system bandwidth different and introduction of a relay. LTE-A aims to support a wideband of up to 100 MHz. To achieve this, LTE-A employs carrier aggregation or bandwidth aggregation that accomplishes a wideband using a plurality of frequency blocks. Carrier aggregation uses a plurality of frequency blocks as a large logical frequency band in order to achieve a wider frequency band. The bandwidth of each frequency block can be defined on the basis of a system block bandwidth used in LTE. Each frequency block is transmitted using a component carrier.

Figure 2:
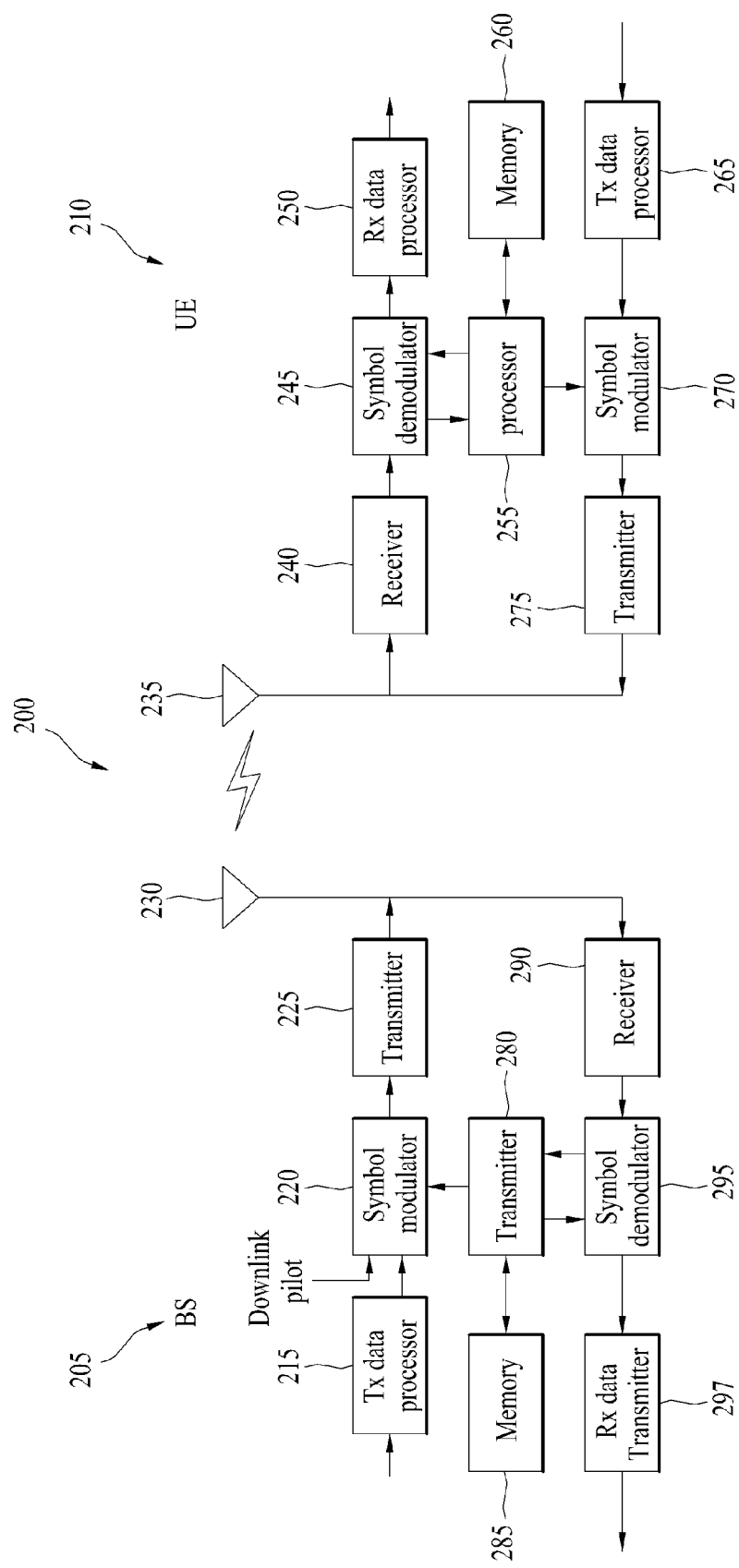
FIG. 2 is a block diagram illustrating configurations of a base station (BS) 105 and a UE 110 in a wireless communication system 100 according to the present invention.

FIG. 2 is a block diagram illustrating configurations of an eNB 105 and a UE 110 in a wireless communication system 100.

While one eNB 105 and one UE 110 are shown in FIG. 2 to simplify the configuration of the wireless communication system 100, the wireless communication system 100 may obviously include one or more eNBs and/or one or more UEs.

Referring to FIG. 2, the eNB 105 may include a transmission (Tx) data processor 115, a symbol modulator 120, a transmitter 125, a Tx/Rx antenna 130, a processor 180, a memory 185, a receiver 190, a symbol demodulator 195, and an Rx data processor 197. The UE 110 may include a Tx data processor 165, a symbol modulator 170, a transmitter 175, a Tx/Rx antenna 135, a processor 155, a memory 160, a receiver 140, a symbol demodulator 145, and an Rx data processor 150. While the antennas 130 and 135 are each shown as a single antenna in the eNB 105 and the UE 110, the eNB 105 and the UE 110 include multiple antennas. Hence, the eNB 105 and the UE 110 support MIMO (Multiple Input Multiple Output). Furthermore, the eNB 105 may support both single user-MIMO (SU-MIMO) and multi-user-MIMO (MU-MIMO) in the present invention.

On the downlink, the Tx data processor 115 receives traffic data, processes the received traffic data through formatting, coding, interleaving, and modulation (or symbol mapping), and thus outputs modulated symbols ("data symbols"). The symbol modulator 120 processes the data symbols received from the Tx data processor 115 and pilot symbols, thus producing a symbol stream.

More specifically, the symbol modulator 120 multiplexes the data symbols and the pilot symbols and transmits the multiplexed symbols to the transmitter 125. Each transmission symbol may be a data symbol, a pilot symbol or a zero signal value. Pilot symbols may be transmitted successively during each symbol period. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 converts the symbol stream into one or more analog signals and generates a downlink signal suitable for transmission on a radio channel by additionally processing the analog signals (e.g. amplification, filtering, and frequency upconversion). The downlink signal is transmitted to the UE 110 through the antenna 130.

The UE 110 receives the downlink signal from the eNB 105 through the antenna 135 and provides the received downlink signal to the receiver 140. The receiver 140 processes the downlink signal, for example, through filtering, amplification and frequency downconversion and converts the processed downlink signal into digital samples. The symbol demodulator 145 demodulates received pilot symbols and outputs the demodulated pilot symbols to the processor 155 for use in channel estimation.

The symbol demodulator 145 receives a frequency response estimate with respect to downlink from the processor 155, acquires data symbol estimates (i.e. estimates of the transmitted data symbols) by demodulating the received data symbols using the frequency response estimate and provides the data symbol estimates to the Rx data processor 150. The Rx data processor 150 demodulates the data symbol estimates (i.e. performs symbol demapping), deinterleaves the demodulated data symbols, and decodes the deinterleaved data symbols, thereby recovering the traffic data transmitted by the eNB 105.

The operations of the symbol demodulator 145 and the Rx data processor 150 are complementary to the operations of the symbol modulator 120 and the Tx data processor 115 of the eNB 105.

On the uplink, in the UE 110, the Tx data processor 165 outputs data symbols by processing received traffic data. The symbol modulator 170 multiplexes the data symbols received from the Tx data processor 165 with pilot symbols, modulates the multiplexed symbols, and outputs a stream of the symbols to the transmitter 175. The transmitter 175 generates an uplink signal by processing the symbol stream and transmits the uplink signal to the eNB 105 through the antenna 135.

The eNB 105 receives the uplink signal from the UE 110 through the antenna 130. In eNB BS 105, the receiver 190 acquires digital samples by processing the uplink signal. The symbol demodulator 195 provides uplink pilot symbol estimates and uplink data symbol estimates by processing the digital samples. The Rx data processor 197 processes the data symbol estimates, thereby recovering the traffic data transmitted by the UE 110.

The processors 155 and 180 control, adjust and manage operations of the UE 110 and the eNB 105. The processors 155 and 180 may be connected respectively to the memories 160 and 185 that store program code and data. The memories 160 and 185 store an operating system, applications, and general files, in connection with the processors 155 and 180.

The processors 155 and 180 may also be called controllers, microcontrollers, microprocessors, or microcomputers. The processors 155 and 180 may be configured in hardware, firmware, software, or a combination thereof. When embodiments of the present invention are implemented using hardware, application specific integrated circuits (ASICs), digital signal processors (DSPs), digital signal processing devices (DSPDs), programmable logic devices (PLDs), or field programmable gate arrays (FPGAs) which are adapted to implement the present invention may be included in the processors 155 and 180. When the embodiments of the present invention are implemented using firmware or software, the firmware or software may be configured to include a module, a procedure, a function, etc. which performs functions or operations according to the present invention. The firmware or software may be included in the processors 155 and 180, or stored in the memories 160 and 185 and invoked from the memories 160 and 185 by the processors 155 and 180.

The layers of radio interface protocols between a UE/BS and a network may be classified into Layers 1, 2 and 3 (L1, L2 and L3) based on the three lowest layers of the open system interconnection (OSI) model. A physical layer corresponds to L1 and provides an information transmission service on physical channels. A radio resource control (RRC) layer corresponds to L3 and provides radio control resources between the UE and the network. The UE/eNB and the network exchange RRC messages through the RRC layer.

The term eNB used in the present invention can refer to a "cell or sector" when used as a regional concept. A serving eNB (or serving cell) can be regarded as an eNB which provides main services to UEs and can transmit and receive control information at a coordinated multiple transmission point. In this sense, the serving eNB (or serving cell) can be referred to as an anchor eNB (or anchor cell). Similarly, a neighbor eNB can be referred to as a neighbor cell.

Codebook Based Precoding Scheme

To support MIMO transmission, precoding for appropriately distributing transmission information to antennas according to channel state can be applied. Codebook based precoding refers to a scheme in which a transmitting side and a receiving side predetermine a set of precoding matrices, the receiving side (e.g. UE) measures channel information from the transmitting side (e.g. eNB) and feeds back information on a most suitable precoding matrix (i.e. precoding matrix index (PMI)) to the transmitting side and the transmitting side applies appropriate precoding to signal transmission.

Since the codebook based precoding scheme selects an appropriate matrix from the predetermined set of precoding matrices, feedback overhead can be reduced compared to explicit feedback of optimal precoding information to actual channel information although optimal precoding is not applied all the time.

Figure 3:
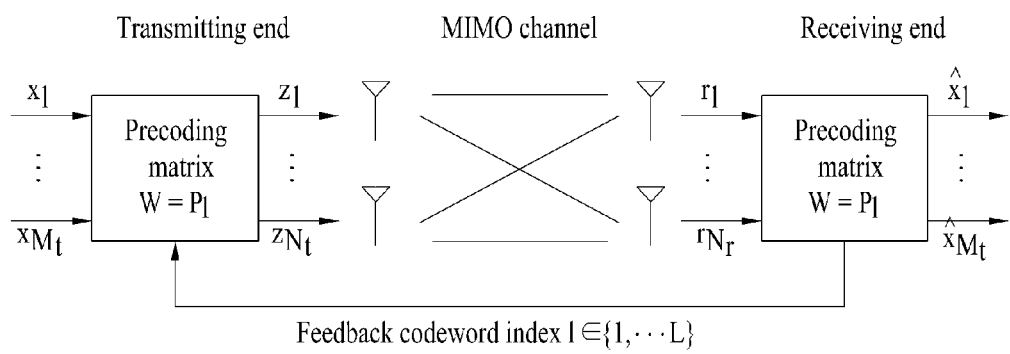
FIG. 3 illustrates the basic concept of codebook based precoding.

FIG. 3 illustrates the basic concept of codebook based precoding.

According to the codebook based precoding scheme, the transmitting side and the receiving side share codebook information including a predetermined number of precoding matrices which are predetermined based on transmission rank, number of antennas, etc. That is, when feedback information is finite, a precoding based codebook scheme can be used. The receiving side can measure channel state through a received signal and feed back a finite number of pieces of preferred precoding matrix information (i.e. indices of corresponding precoding matrices) to the transmitting side on the basis of the aforementioned codebook information. For example, the receiving side can measure a received signal using ML (Maximum Likelihood) or MMSE (Minimum Mean Square Error) and select an optimal precoding matrix. While FIG. 3 shows that the receiving side transmits precoding matrix information per codeword to the transmitting side, the present invention is not limited thereto.

Upon reception of feedback information from the receiving side, the transmitting side can select a specific precoding matrix from the codebook based on the received information.

The transmitting side can perform precoding by multiplying layer signals corresponding to a transmission rank by the selected precoding matrix and transmit precoded transmission signals to the receiving side through a plurality of antennas. In a precoding matrix, the number of rows equals the number of antennas and the number of columns equals the number of layers. For example, when the number of Tx antennas is 4 and the number of transport layers is 2, a 4×2 matrix can be configured as a precoding matrix. Information transmitted through each layer can be mapped to each antenna through the precoding matrix.

Upon reception of the precoded signals transmitted from the transmitting side, the receiving side can perform inverse processing of precoding performed by the transmitting side on the received signals to recover the received signals. Since a precoding matrix satisfies unitary matrix (U) conditions such as $U*U^H = I$, inverse processing of precoding can be performed in such a manner that the received signals are multiplied by a Hermitian matrix $P^H$ of the precoding matrix P used for precoding of the transmitting side.

Table 1 shows a codebook used for downlink transmission using 2 Tx antennas in 3GPP LTE Release-8/9 and Table 2 shows a codebook used for downlink transmission using 4 Tx antennas in 3GPP LTE Release-8/9.

TABLE 1

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers υ | | |
|---|---|---|---|---|
| | | 2 | 3 | 4 |
| 0 | $u_0 = [1\ -1\ -1\ -1]^T$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{12\}}/\sqrt{2}$ | $W_{12}^{\{123\}}/\sqrt{3}$ | $W_{12}^{\{1324\}}/2$ |
| 13 | $u_{13} = [1\ -1\ 1\ -1]^T$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{12\}}/\sqrt{2}$ | $W_{15}^{\{123\}}/\sqrt{3}$ | $W_{15}^{\{1234\}}/2$ |

In Table 2, $W_n^{\{s\}}$ is obtained form a set $\{s\}$ configured from $W_n = I - 2u_n u_n^H / u_n^H u_n$. Here, I denotes a 4×4 unitary matrix and u is a value obtained from Table 2.

As shown in Table 1, the codebook for 2 Tx antennas has a total of 7 precoding vectors/matrices. Here, since the unitary matrix is for an open-loop system, the number of precoding vectors/matrices for precoding of a closed-loop system becomes 6. The codebook for 4 Tx antennas, shown in Table 2, has a total or 64 precoding vectors/matrices.

The aforementioned codebook has common characteristics such as constant modulus (CM) characteristics, nested property, constrained alphabet, etc. According to CM characteristics, elements of all precoding matrices in the codebook do not include '0' and have the same size. According to the nested property, a precoding matrix of a low rank is composed of a subset of a specific column of a precoding matrix of a high rank. The constrained alphabet characteristic refers to a characteristic that alphabets of elements of all precoding matrices in the codebook are composed of $$\left\{\pm 1,\ \pm j,\ \pm \frac{(1+j)}{\sqrt{2}},\ \pm \frac{(-1+j)}{\sqrt{2}}\right\}.$$

In Table 2, $W_n^{\{s\}}$ is obtained form a set $\{s\}$ configured from $W_n = I - 2u_n u_n^H / u_n^H u_n$. Here, I denotes a 4×4 unitary matrix and $u_n$ is a value obtained from Table 2.

As shown in Table 1, the codebook for 2 Tx antennas has a total of 7 precoding vectors/matrices. Here, since the unitary matrix is for an open-loop system, the number of precoding vectors/matrices for precoding of a closed-loop system becomes 6. The codebook for 4 Tx antennas, shown in Table 2, has a total or 64 precoding vectors/matrices.

The aforementioned codebook has common characteristics such as constant modulus (CM) characteristics, nested property, constrained alphabet, etc. According to CM characteristics, elements of all precoding matrices in the codebook do not include '0' and have the same size. According to the nested property, a precoding matrix of a low rank is composed of a subset of a specific column of a precoding matrix of a high rank. The constrained alphabet characteristic refers to a characteristic that alphabets of elements of all precoding matrices in the codebook are composed of $$\left\{\pm 1, \pm j, \pm \frac{(1+j)}{\sqrt{2}}, \pm \frac{(-1+j)}{\sqrt{2}}\right\}.$$

Feedback Channel Structure

In FDD (Frequency Division Duplex) systems, an eNB cannot be aware of information on a downlink channel and thus channel information fed back by a UE is used for downlink transmission. In case of 3GPP LTE Release-8/9, a UE can feed back downlink channel information through a PUCCH or a PUSCH. The UE periodically feeds back channel information in the case of PUCCH and aperiodically feeds back the channel information at the request of the eNB in the case of PUSCH. In addition, channel information on an allocated frequency band (i.e. wideband (WB)) may be fed back or channel information on a specific number of RBs (i.e. subband (SB)) may be fed back.

Extended Antenna Configuration

Figure 4:
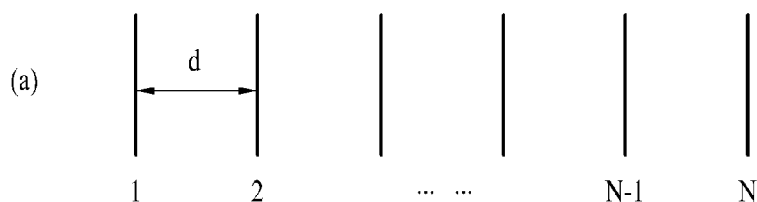
FIG. 4 illustrates exemplary 8-transmission (Tx) antenna configurations.
Figure 4:
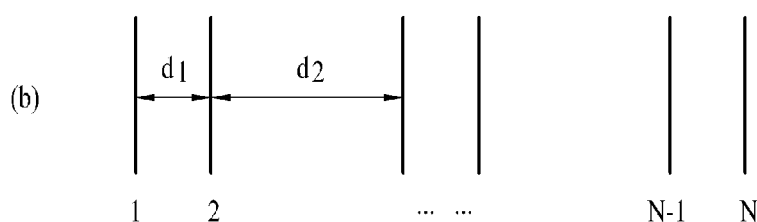
Figure 4:
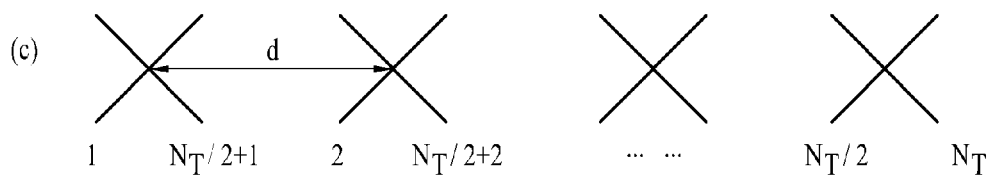

FIG. 4 illustrates exemplary 8-Tx antenna configurations.

FIG. 4(a) illustrates a case in which N antennas configure independent channels without being grouped, which is referred to as a uniform linear array (ULA). In this case, a space for a transmitter and/or a receiver may be insufficient to configure independent channels by spacing out a plurality of antennas.

FIG. 4(b) illustrates a paired ULA in which antennas are paired. In this case, a related channel can be configured for paired antennas and independent channels may be configured for different antenna pairs.

3GPP LTE Release-10 may use 8 Tx antennas on downlink, distinguished from 3GPP LTE Release-8/9 using 4 Tx antennas. To apply this extended antenna configuration, ULA antenna configurations as shown in FIGS. 4(a) and 4(b) may not be suitable since a plurality of Tx antennas needs to be installed in an insufficient space. Accordingly, a dual-pole (or cross-pole) antenna configuration as shown in FIG. 4(c) can be considered. In this case, antenna correlation can be reduced to enable data transmission with high throughput even if a distance d between antennas is short.

Codebook Structure

As described above, feedback overhead when a receiving side feeds back precoding information to be used for MIMO transmission from a transmitting side can be reduced by sharing a pre-defined codebook between the transmitting and the receiving side, achieving efficient precoding.

To configure a pre-defined codebook, a precoder matrix can be configured using a DFT (Discrete Fourier Transform) matrix or Walsh matrix. Otherwise, precoders in various forms can be configured according to combination with a phase shift matrix or phase shift diversity matrix.

DFT codebooks provide high performance for co-polarization antennas. In configuration of a DFT matrix based codebook, an n×n DFT matrix can be defined as represented by Equation 3.

$$DFTn:D_n(k, \ell) = \frac{1}{\sqrt{n}}\exp(-j2\pi k\ell/n), \quad \text{[Equation 3]}$$

$$k, \ell = 0, 1, \ldots, n-1$$

In the case of the DFT matrix of Equation 3, only one matrix is present for a specific size n. Accordingly, a rotated version of the DFTn matrix may be additionally configured and used in order to define various precoding matrices and appropriately use the precoding matrices. Equation 4 represents an exemplary rotated DFTn matrix.

$$\text{rotated } DFTn:D_n^{(G,g)}(k, \ell) = \frac{1}{\sqrt{n}}\exp(-j2\pi k(\ell+g/G)/n), \quad \text{[Equation 4]}$$

$$k, \ell = 0, 1, \ldots, n-1, g = 0, 1, \ldots, G.$$

When the DFT matrix, as represented by Equation 4, is configured, G rotated DFTn matrices can be generated and the generated matrices satisfy characteristics of the DFT matrix.

A description will be given of a Householder-based cookbook structure. A Householder-based codebook refers to a codebook composed of a Householder matrix. The Householder matrix is used for Householder transform, and Householder transform is a kind of linear transformation and can be used to perform QR decomposition. QR decomposition refers to decomposition of a matrix into an orthogonal matrix Q and an upper triangular matrix R. The upper triangular matrix refers to a square matrix in which all principal diagonal components are 0. An exemplary 4×4 Householder matrix is represented by Equation 5.

$$M_1 = I_4 - 2u_0 u_1^H / \|u_0\|^2 \quad \text{[Equation 5]}$$

$$= \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix},$$

$$u_0^T = [\,1 \quad -1 \quad -1 \quad -1\,]$$

A 4×4 unitary matrix having CM characteristic can be generated according to Householder transform. An n×n precoding matrix can be generated using Householder transform and a column subset of the generated precoding matrix can be used as a precoding matrix for transmission of a rank less than n, like a codebook for 4 Tx antennas as shown in Table 4.

Codebook for 8 Tx Antennas

In a 3GPP LTE release-10 system having an extended antenna configuration (e.g. 8 Tx antennas), a feedback scheme used in 3GPP LTE release-8/9 can be extended and applied. For example, channel state information (CSI) such as a rank indicator (RI), a precoding matrix index (PMI) and channel quality information (CQI) can be fed back. A description will be given of a method for designing a dual precoder based feedback codebook which can be used in a system supporting an extended antenna configuration. In the dual precoder based feedback codebook, a receiving end can transmit a PMI to a transmitting end in order to indicate a precoder to be used for MIMO transmission. In this case, a precoding matrix can be indicated by a combination of two different PMIs. That is, the receiving end can feed back two different PMIs (i.e. a first PMI and a second PMI) to the transmitting end and the transmitting end can determine a precoding matrix indicated by a combination of the first and second PMIs and apply the precoding matrix to MIMO transmission.

In design of the dual precoding based feedback codebook, 8 Tx antenna MIMO support, single user MIMO (SU-MIMO) and MU-MIMO, suitability for various antenna configurations, standards for codebook design, codebook size and the like may be considered.

It is possible to consider a feedback codebook which supports only SU-MIMO in the case of a rank greater than 2, is optimized for both SU-MIMO and MU-MIMO in the case of rank 2 or less and is adapted to various antenna configurations, as a codebook applied to MIMO using 8 Tx antennas.

As to MU-MIMO, it is desirable that UEs participating in MU-MIMO be separated in a correlation domain. Accordingly, a codebook for MU-MIMO needs to be designed to correctly operate in channels having high correlation. Since DFT vectors provide satisfactory performance in channels having high correlation, inclusion of a DFT vector in a set of codebooks of up to rank-2 may be considered. In addition, in a high scattering propagation environment capable of generating a large number of spatial channels (e.g. an indoor environment having a large amount of reflective waves), SU-MIMO may be more suitable as a MIMO transmission scheme. Accordingly, codebooks for ranks greater than 2 may be designed such that the codebooks enable multiple layers to be discriminated.

In design of precoders for MIMO transmission, it is desirable that one precoder configuration provide satisfactory performance for various antenna configurations (low-correlation, high-correlation and cross-polarization antenna configurations). In the arrangement of 8 Tx antennas, a cross-polarization array having an antenna interval of 4λ may be configured as a low-correlation antenna configuration, a ULA having an antenna interval of 0.5λ may be configured as a high-correlation antenna configuration, or a cross-polarization array having an antenna interval of 0.5λ may be configured as a cross-polarization antenna configuration. DFT based codebook configurations can provide satisfactory performance for high-correlation antenna configurations.

Block diagonal matrices may be more suitable for cross-polarization antenna configuration. Accordingly, when a diagonal matrix is introduced to a codebook for 8 Tx antennas, a codebook providing satisfactory performance for all antenna configurations can be generated.

Standards for codebook design allow codebooks to satisfy a unitary codebook, CM characteristic, finite alphabets, appropriate codebook size, nested characteristics and the like, as described above. The standards are applied to 3GPP LTE release-8/9 codebook design and application of the standards for codebook design to 3GPP LTE release-10 codebook design supporting extended antenna configurations may be considered.

The codebook size needs to increase in order to sufficiently support the advantage of using 8 Tx antennas. To obtain a sufficient precoding gain from 8 Tx antennas in a low-correlation environment, a large-sized codebook (e.g. a codebook having 4 bits or more for rank 1 and rank 2) may be required. A 4-bit codebook may be sufficient to obtain a precoding gain in a high-correlation environment. However, codebook sizes for rank 1 and rank 2 can be increased in order to accomplish multiplexing gain of MU-MIMO.

A description will be given of a codebook configuration of a precoding matrix, which is fed back by a receiving end such that a transmitting end can effectively perform beamforming, a codebook generation scheme and a signal transmission method using the same according to the present invention on the basis of the above description.

Embodiments of the present invention, described below, are effective when the transmitting end uses a massive antenna employing an active antenna system (AAS) and the massive antenna can be used for downlink communication between a BS and a UE in a cellular network in a representative embodiment.

Figure 5:
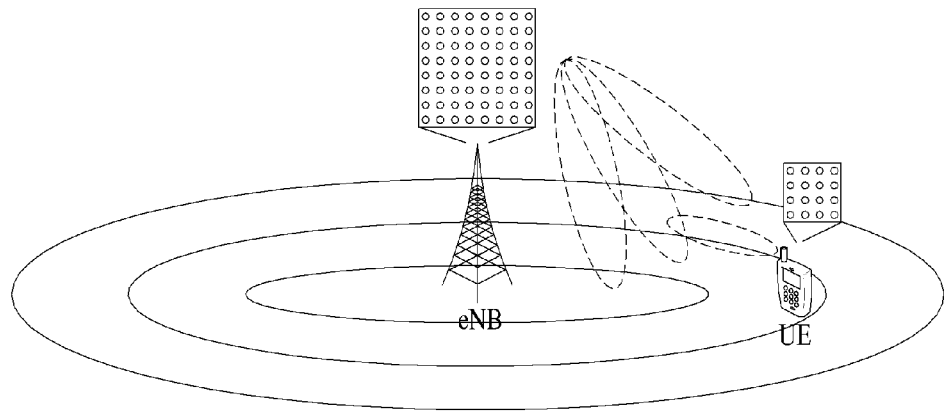
FIG. 5 illustrates an active antenna system (AAS)

FIG. 5 illustrates the AAS.

Introduction of the AAS is considered in wireless communication systems following LTE Rel-12. The AAS refers to a system composed of active antennas each of which includes an active circuit capable of controlling the phase and magnitude of a signal, distinguished from a conventional passive antenna system in which the active circuit is separated from an antenna.

Particularly, the AAS is efficient in terms of energy and operation cost since the AAS uses active antennas and thus does not require an additional cable, connector, hardware and the like to connect the active circuit to antennas. In addition, since the AAS supports electronic beam control for each antenna, the AAS enables enhanced MIMO technology such as formation of an accurate beam pattern in consideration of a beam direction and a beam width or formation of a three-dimensional beam pattern.

With the introduction of an enhanced antenna system such as the AAS, a large-scale MIMO system having a plurality of input/output antennas and a multi-dimensional antenna structure is considered. For example, when a two-dimensional antenna array instead of a conventional linear antenna array is formed, a three-dimensional beam pattern can be generated according to active antennas of the AAS.

Accordingly, when an eNB uses the three-dimensional beam pattern, the eNB can consider sector formation in the vertical direction of the beam as well as the horizontal direction. Furthermore, when a UE forms a reception beam using a large-scale reception antenna, the UE can expect a signal power increase according to antenna array gain and thus system performance requirements can be satisfied only with lower Tx power than that required for conventional antenna systems.

Figure 6:
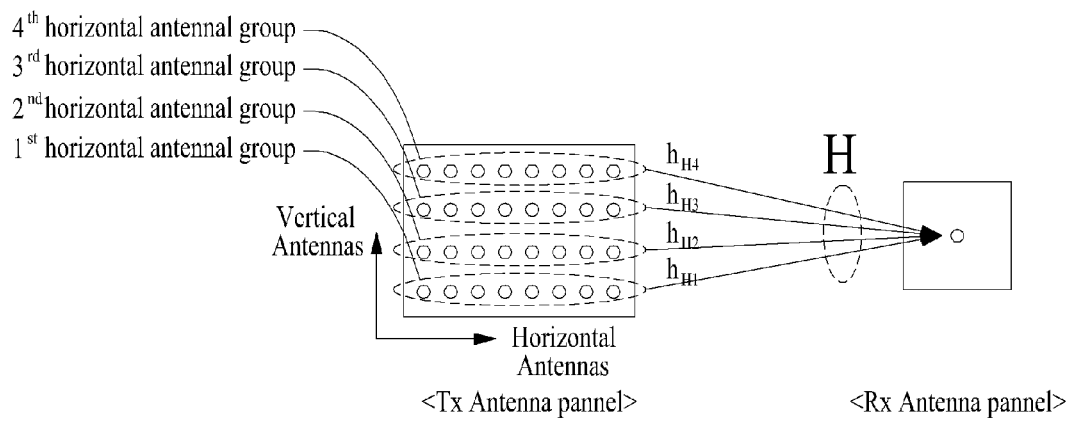
FIG. 6 illustrates a communication system having massive multiple transmission antennas using a horizontal antenna array and a vertical antenna array in a two-dimensional antenna panel.

FIG. 6 illustrates a communication system having massive multiple transmission antennas using a horizontal antenna array and a vertical antenna array in a two-dimensional antenna panel.

While description is based on the communication system having one reception (Rx) antenna in FIG. 6, the same scheme can be applied to MIMO systems having multiple Tx/Rx antennas. $N_H$ denotes the number of horizontal antennas and $N_V$ denotes the number of vertical antennas.

In FIG. 6, a transmitting end has a total of 32 antennas since $N_H=8$ and $N_V=4$. $h_{H_i}$ is a 1-row $N_H$-column matrix and indicates a channel between an i-th horizontal antenna group indicated by a dotted line and a receiving end, and all channels are indicated by $H=[(h_{H1})^*(h_{H2})^*(h_{H3})^*(h_{H4})^*]^*$. The antennas are arranged at an equal interval of $d_H$ in the horizontal direction and an equal interval of $d_V$ in the vertical direction. In addition, it is assumed that the antennas are densely arranged (for example, antennas are arranged at an interval of less than half wavelength) and thus channel correlation is present between antenna ports.

Antenna topology for each horizontal antenna group is a ULA in which antennas are arranged at a narrow interval and thus channel elements of $h_{H_i}$ have a linear phase increase characteristic. Accordingly, $h_{H_i}$ can be represented as a DFT matrix having the linear phase increase characteristic. Equation 6 represents the DFT matrix. In Equation 6, $N_H$ denotes the number of horizontal antennas, M denotes the number of DFT column vectors and mn denotes a row m and a column n of the matrix. In addition, $d_i$ indicates an i-th column vector of $D^{N_H \times M}$, which has $N_H$ rows and one column.

$$D_{mn}^{N_H \times M} = e^{j\frac{2\pi(m-1)(n-1)}{M}}$$
$$D^{N_H \times M} = [\, d_1 \quad d_2 \quad \ldots \quad d_M \,]$$
[Equation 6]

The horizontal antenna groups are densely arranged at an equal interval of $d_v$ in the vertical direction and thus $h_{H_1}$, $h_{H_2}$, $h_{H_3}$ and $h_{H_4}$ have high correlation. Considering this channel characteristic, feedback overhead can be reduced by extracting a group of codewords having high correlation from a codebook and selecting a PMI of $h_{H_i}$ in the codeword group, rather than selecting $h_{H_i}$ from the codebook.

Considering the aforementioned channel characteristic of the massive antenna, there are two codebooks $C_1$ and $C_2$ and it is effective to represent one final PMI by combining the two codebooks.

$$C_1 = \{\{d_1, d_2, \ldots, d_K\}, \{d_{K+1}, d_{K+2}, \ldots, d_{2K}\}, \ldots, \{d_{(L-1)K+1}, d_{(L-1)K+2}, \ldots, d_{LK}\}\}$$
[Equation 7]

In Equation 7, the codebook $C_1$ has L codewords each of which is defined by K matrices or vectors having a high correlation coefficient. $d_i$ indicates an i-th column vector of the DFT matrix defined above. $C_1$ is configured as a DFT matrix by applying the ULA channel characteristic of the horizontal antenna groups thereto.

The DFT matrix $D^{N_H \times M}$ includes mutually orthogonal column vectors at an interval of $$\frac{M}{N_H}$$

and column vectors, which are closer to each other, have a higher correlation coefficient. For example, the i-th column vector of the DFT matrix is orthogonal to the $$\left(\left((i-1) + \frac{M}{N_H}j\right)\bmod M + 1\right) - th$$

column vector (j being an integer and mod indicating a modular operation) and (i mod M+1)-th and ((i−2) mod M+1)-th column vectors have a highest correlation efficient. Accordingly, it is effective that K is set to a value less than $$\frac{M}{N_H}$$

and neighboring DFT column vector groups are set to codewords in Equation 7.

Furthermore, even when new codewords are fed back, it is desirable to generate the same precoding matrix using previously fed back codewords and part of the new codewords by setting the codewords in Equation 7 such that a subset thereof is present even though the codewords are mutually exclusive. This enables effective beamforming by reflecting continuously varying properties of channels for time-frequency thereto.

In addition, the codewords of $C_1$ may be set such that the codewords are fed back in a longer period than that of codewords of $C_2$ in consideration of wideband or long-term channel statistics.

The codebook $C_2$ is a matrix or vector group selected from $C_1$ and codewords of $C_2$ represent a matrix or a vector. For example, when the first codeword is selected from $C_1$, $C_2$ is defined as represented by Equation 8.

$$C_2 = \{d_1, d_2, \ldots, d_K\}$$
[Equation 8]

Referring to Equation 8, $C_2$ is determined by C1. When $C_1$ is configured in the form of a DFT matrix, $C_2$ is configured as part of column vectors of the DFT matrix. However, $C_2$ may be defined as a set of all column vectors of the DFT matrix. In this case, $C_1$ does not exist.

In $C_2$, a codeword, which maximizes a metric on the basis of $h_{H_i}$, is selected and fed back. The metric can be defined in various forms. Typically, the metric can be defined as a correlation coefficient with respect to $h_{H_i}$, a correlation coefficient with respect to the dominant singular vector of $h_{H_i}$, SINR or the like. For example, when a high correlation coefficient with respect to $h_{H_i}$ is used as a basis, a precoding matrix fed back by the UE to the eNB is as follows.

$$P = [d_1^* d_2^* d_3^* d_4^*]^*$$
[Equation 9]

The precoding matrix of Equation 9 is generated by applying channel characteristics of the horizontal antennas thereto. However, the linear phase increase relationship between antenna ports is established according to ULA characteristics on the assumption that the vertical antennas are also densely arranged. Accordingly, it is more effective to generate a precoding matrix by applying channel characteristics of the vertical antennas thereto. To this end, a codebook $C_3$ can be additionally generated in the form of a DFT matrix.

$$C_3 = \{\alpha_1, \alpha_2, \ldots, \alpha_J\},$$

where $$[\alpha_1 \alpha_2 \ldots \alpha_J] = D^{N_V \times J}$$
[Equation 10]

When the UE selects the first codeword of $C_3$, the precoding matrix fed back to the eNB is modified into a precoding matrix represented by Equation 11. In Equation 11, $\alpha_{1i}$ denotes the i-th element of $\alpha_1$.

$$P = [(\alpha_{11}d_1)^*(\alpha_{12}d_2)^*(\alpha_{13}d_3)^*(\alpha_{14}d_4)^*]^*$$
[Equation 11]

A precoding matrix for a single rank, which is generated using $C_1$, $C_2$ and $C_3$, can be normalized as represented by Equation 12. In Equation 12, i denotes a codeword index of $C_3$ and $k_1$, $k_2$, $k_3$ and $k_4$ indicate codeword indexes of $C_2$.

$$P = [(\alpha_{i1}d_{k_1})^*(\alpha_{i2}d_{k_2})^*(\alpha_{i3}d_{k_3})^*(\alpha_{i4}d_{k_4})^*]^*$$
[Equation 12]

Figure 7:
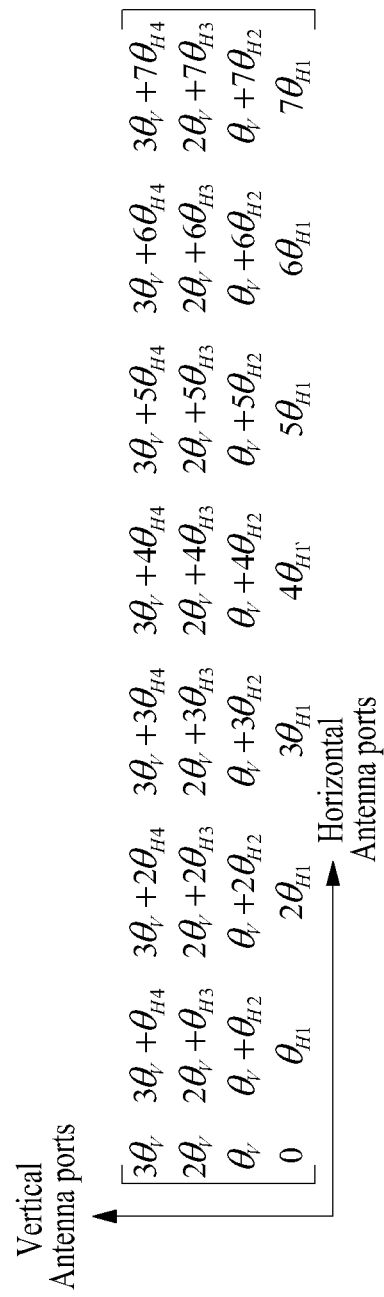
FIGS. 7 and 8 are views illustrating mapping of only phase information of a precoding matrix which does not satisfy a linear phase increase characteristic to antenna ports.

FIG. 7 illustrates mapping of only phase information of a precoding matrix, generated using DFT based $C_1$, $C_2$ and $C_3$, to antenna ports. Elements of the precoding matrix are set to an equal size of 1 and represent entire information of the precoding matrix since only a phase difference is present among the elements.

Figure 8:
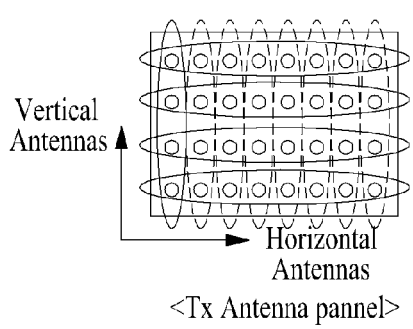
Figure 8:
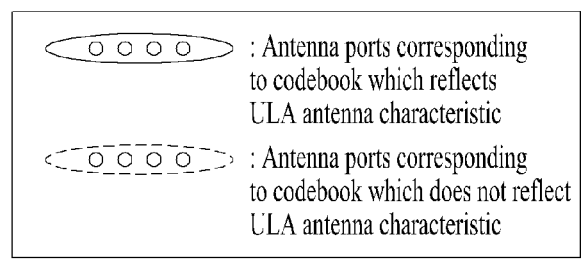

In FIG. 7, parts of the precoding matrix, which correspond to horizontal antennas, have the linear phase increase characteristic according to DFT characteristics. Conversely, parts of the precoding matrix do not guarantee the linear phase increase characteristic in vertical antenna groups other than the first vertical antenna group even though $C_3$ is used for the precoding matrix. Specifically, referring to FIG. 8, the first vertical antenna group is composed of antenna ports corresponding to codebooks which reflect the ULA antenna characteristic, whereas the second and following vertical antenna groups are composed of antenna ports corresponding to codebooks which do not reflect the ULA antenna characteristic.

Accordingly, to design a precoding matrix having the linear phase increase characteristic in both the horizontal and vertical directions, the following phase relationship needs to be established.

Figure 9:
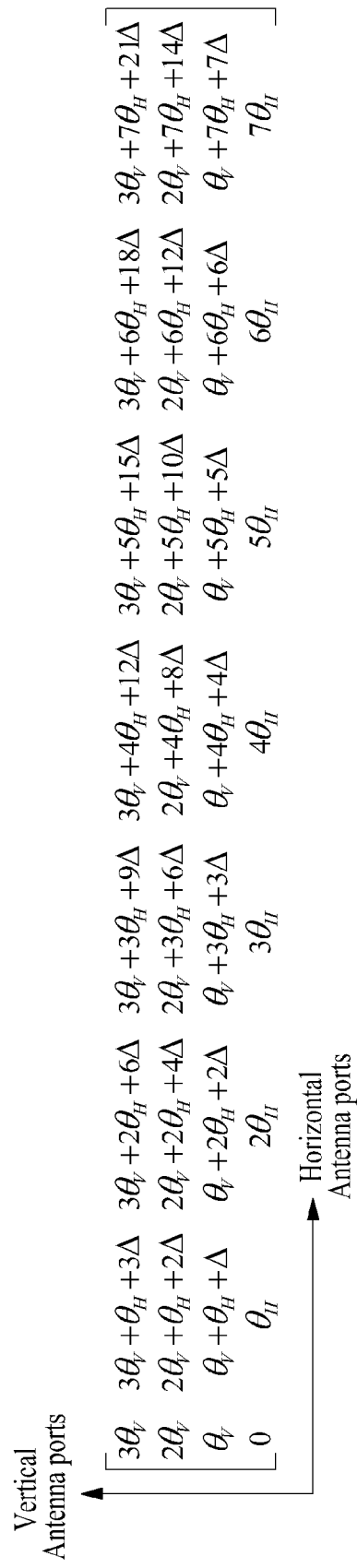
FIG. 9 is a view illustrating mapping only phase information of a precoding matrix which satisfies the linear phase increase characteristic to antenna ports.

$\theta_{H2} = \theta_{H1} + \Delta$ $\theta_{H3} = \theta_{H1} + 2\Delta$ $\theta_{H4} = \theta_{H1} + 3\Delta$ FIG. 9 is a view illustrating mapping of only phase information of a precoding matrix, which satisfies Equation 13, to antenna ports. In FIG. 9, all horizontal and vertical antenna ports have the linear phase increase characteristic.

That is, the present invention presents a method of imposing restrictions on selection of a most suitable codeword of $h_{H_i}$ from $C_2$ such that $P=[(\alpha_{i1}d_{k_1})^*(\alpha_{i2}d_{k_2})^*(\alpha_{i3}d_{k_3})^*(\alpha_{i4}d_{k_4})^*]^*$ becomes a precoding matrix that satisfies Equation 13. When a codeword corresponding to $h_{H_i}$ is assumed as $\tilde{h}_{H_i}$ and a difference between a phase increment of $\tilde{h}_{H1}$ and a phase increment of $\tilde{h}_{H2}$ is $\Delta$, the condition of Equation 13 can be satisfied only when a phase increment difference of $\Delta$ is present between $\tilde{h}_{H3}$ and $\tilde{h}_{H2}$ and a phase increment difference of $2\Delta$ is present between $\tilde{h}_{H4}$ and $\tilde{h}_{H2}$.

That is, the present invention presents a method of setting $\tilde{h}_{H3}$ and $\tilde{h}_{H4}$ such that $\tilde{h}_{H3}$ and $\tilde{h}_{H4}$ satisfy the phase relationship of Equation 13 upon determination of $\tilde{h}_{H1}$ and $\tilde{h}_{H2}$. According to the present invention, when $\tilde{h}_{H1}$ and $\tilde{h}_{H2}$ respectively correspond to i-th and j-th column vectors of $D^{N_H \times M}$, $\tilde{h}_{H3}$ and $\tilde{h}_{H4}$ are respectively determined as $(((j-1)+|i-j|) \mod M+1)$-th and $(((j-1)+2|i-j|) \mod M+1)$-th column vectors of $D^{N_H \times M}$. Here, $|i-j|$ refers to a value identical to $\Delta$ since $|i-j|$ indicates phase increments of the two codewords, and differences of $\Delta$ and $2\Delta$ are respectively present between $\tilde{h}_{H3}$ and the second codeword (i.e. the j-th column vector) and between $\tilde{h}_{H4}$ and the second codeword. Accordingly, $\tilde{h}_{H3}$ and $\tilde{h}_{H4}$ are determined in consideration of the number of column vectors of the DFT matrix.

A description will be given of embodiments of the present invention for precoding matrix feedback.

First Embodiment

According to the first embodiment of the present invention, the UE can select $\tilde{h}_{H1}$ from $C_2$, select codewords of the remaining horizontal antenna groups from the matrix $D^{N_H \times M}$ and feed back $\tilde{h}_{H1}$ and the codewords.

Specifically, the UE can select $\tilde{h}_{H1}$ from $C_2$, select $\tilde{h}_{H2}$ from $D^{N_H \times M}$ and then determine $\tilde{h}_{H3}$ and $\tilde{h}_{H4}$ as the $(((j-1)+|i-j|) \mod M+1)$-th and $(((j-1)+2|i-j|) \mod M+1)$-th column vectors of $D^{N_H \times M}$ when $\tilde{h}_{H1}$ and $\tilde{h}_{H2}$ respectively correspond to the i-th and j-th column vectors of $D^{N_H \times M}$.

Second Embodiment

According to the second embodiment of the present invention, the UE can select $\tilde{h}_{H1}$ and $\tilde{h}_{H2}$ from $C_2$, select codewords of the remaining horizontal antenna groups from the matrix $D^{N_H \times M}$ and feed back $\tilde{h}_{H1}$ and $\tilde{h}_{H2}$ and the codewords.

Specifically, the UE can select $\tilde{h}_{H1}$ and $\tilde{h}_{H2}$ from $C_2$ and determine $\tilde{h}_{H3}$ and $\tilde{h}_{H4}$ as the $(((j-1)+|i-j|) \mod M+1)$-th and $(((j-1)+2|i-j|) \mod M+1)$-th column vectors of $D^{N_H \times M}$ when $\tilde{h}_{H1}$ and $\tilde{h}_{H2}$ respectively correspond to the i-th and j-th column vectors of $D^{N_H \times M}$.

Third Embodiment

According to the third embodiment of the present invention, the UE can select codewords of all horizontal antenna groups from the matrix $D^{N_H \times M}$ and feed back the selected codewords.

Accordingly, the UE selects $\tilde{h}_{H1}$ and $\tilde{h}_{H2}$ from $D^{N_H \times M}$ and determines $\tilde{h}_{H3}$ and $\tilde{h}_{H4}$ as the $(((j-1)+|i-j|) \mod M+1)$-th and $(((j-1)+2|i-j|) \mod M+1)$-th column vectors of $D^{N_H \times M}$ when in $\tilde{h}_{H1}$ and $\tilde{h}_{H2}$ respectively correspond to the i-th and j-th column vectors of $D^{N_H \times M}$.

In this case, only one codebook is provided and the codebook is configured in the form of vectors of the DFT matrix. That is, $C_2$ is composed of all vectors of the DFT matrix without using $C_1$ such that codewords $\tilde{h}_{H1}$, $\tilde{h}_{H2}$, $\tilde{h}_{H3}$ and $\tilde{h}_{H4}$ of all horizontal antenna groups can be selected from $C_2$.

To reduce feedback overhead, $\tilde{h}_{H1}$ and $\tilde{h}_{H2}$ can be limited such that $|i-j|<r$ is satisfied in the matrix $D^{N_H \times M}$. Here, r is determined and signaled by the eNB or the UE.

Fourth Embodiment

According to the fourth embodiment of the present invention, the UE can select the codewords $\tilde{h}_{H1}$, $\tilde{h}_{H2}$, $\tilde{h}_{H3}$ and $\tilde{h}_{H4}$ of all horizontal antenna groups from $C_2$ and feed back the selected codewords.

Accordingly, when $C_2$ is composed of part of the vectors of the DFT matrix, the UE selects $\tilde{h}_{H1}$ and $\tilde{h}_{H2}$ from $C_2$ and respectively determines $\tilde{h}_{H3}$ and $\tilde{h}_{H4}$ as the $(j+|i-j|)$-th and $(j+2|i-j|)$-th column vectors of $C_2$ when $\tilde{h}_{H1}$ and $\tilde{h}_{H2}$ respectively correspond to the i-th and j-th column vectors of $C_2$.

In the fourth embodiment of the present invention, it is desirable to determine $\Delta$ or $|i-j|$ such that $\tilde{h}_{H4}$ does not exceed the range corresponding to $C_2$.

Fifth Embodiment

According to the fifth embodiment of the present invention, the UE can select $\tilde{h}_{H1}$ from $C_2$, feed back $\tilde{h}_{H1}$, select $\Delta$ of Equation 13 from $C_2'$ and feed back $\Delta$.

That is, the UE selects $\tilde{h}_{H1}$ from $C_2$, selects $\Delta$ which indicates phase information from codebook $C_2'$ and feeds back the selected values.

In this case, $\tilde{h}_{H2}$, $\tilde{h}_{H3}$ and $\tilde{h}_{H4}$ can be generated by the UE and the eNB according to Equation 13. For example, codebook $C_2'$ can be configured as represented by Equation 14. In Equation 14, R is a value signaled by the eNB to the UE and designates the range of $\Delta$. Furthermore, the eNB may signal candidates for R to the UE. That is, when R is large, $\Delta$ indicates a phase in a narrow range on the basis of 0°.

$$C_2' = \left\{ e^{j\frac{2\pi(q)}{RQ}} \,\middle|\, -Q \leq q \leq Q \right\} \qquad \text{[Equation 14]}$$

where j indicates an integer and Q and q represent predetermined phases.

In the aforementioned embodiments, a linear phase increase in the vertical direction may be represented using $C_3$. The UE feeds back two codewords selected from $C_2$ (or $C_2'$)

and codewords respectively selected from $C_1$ and $C_3$ to the eNB according to the aforementioned embodiments of the present invention. Different codeword feedback periods may be respectively provided for $C_1$, $C_2$ (or $C_2'$) and $C_3$, which will be described later.

While the transmission rank is 1 in the aforementioned embodiments of the present invention, the embodiments can be extended and applied to rank 2 or higher. That is, to generate a precoding matrix for rank 2, codewords of $C_3$, applied to the first rank, and codewords of $C_3$, applied to the second rank, are restricted such that the codewords applied to the first rank are orthogonal to the codewords applied to the second rank and codewords selected from codebooks other than $C_3$ have the same value and are applied to the two ranks so as to generate a precoding matrix in which a precoder of the first rank and a precoder of the second rank are orthogonal.

Equation 15 represents a precoding matrix for rank 2 from among the aforementioned multi-rank precoding matrices. In Equation 15, i and j respectively indicate a codeword index for the first rank and a codeword index for the second index, which are selected from $C_3$, and $k_1$, $k_2$, $k_3$ and $k_4$ denote codeword indices of $C_2$. Here, since $\alpha_i$ and $\alpha_j$ are orthogonal, $(\alpha_i)^* \alpha_j = 0$.

$$P = \begin{bmatrix} (\alpha_{i1} d_{k_1})^* & (\alpha_{i2} d_{k_2})^* & (\alpha_{i3} d_{k_3})^* & (\alpha_{i4} d_{k_4})^* \\ (\alpha_{j1} d_{k_1})^* & (\alpha_{j2} d_{k_2})^* & (\alpha_{j3} d_{k_3})^* & (\alpha_{j4} d_{k_4})^* \end{bmatrix}^* \quad \text{[Equation 15]}$$

In addition, since the codewords of $C_3$ corresponds to an $N_V \times 1$ column vector ($N_V$ being the number of vertical antennas), $N_V$ mutually orthogonal codewords are provided when $C_3$ is generated using a DFT matrix. Accordingly, in the case of a rank of $N_V$ or less, a multi-rank precoding matrix can be generated using the aforementioned method. For example, a precoding matrix for rank 4 can be defined as represented by Equation 16. In Equation 16, i, j, l and m respectively indicate codeword indices for first, second, third and fourth ranks, which are selected from $C_3$, and $k_1$, $k_2$, $k_3$ and $k_4$ respectively denote codeword indices of $C_2$. Here, $\alpha_i$, $\alpha_j$, $\alpha_l$ and $\alpha_m$ are orthogonal.

$$P = \begin{bmatrix} (\alpha_{i1} d_{k_1})^* & (\alpha_{i2} d_{k_2})^* & (\alpha_{i3} d_{k_3})^* & (\alpha_{i4} d_{k_4})^* \\ (\alpha_{j1} d_{k_1})^* & (\alpha_{j2} d_{k_2})^* & (\alpha_{j3} d_{k_3})^* & (\alpha_{j4} d_{k_4})^* \\ (\alpha_{l1} d_{k_1})^* & (\alpha_{l2} d_{k_2})^* & (\alpha_{l3} d_{k_3})^* & (\alpha_{l4} d_{k_4})^* \\ (\alpha_{m1} d_{k_1})^* & (\alpha_{m2} d_{k_2})^* & (\alpha_{m3} d_{k_3})^* & (\alpha_{m4} d_{k_4})^* \end{bmatrix}^* \quad \text{[Equation 16]}$$

The codebook structure and embodiments, which can be effectively used when a massive antenna is constructed on a two-dimensional panel as a co-pole antenna (i.e. antenna having the same polarization), have been described.

Figure 10:
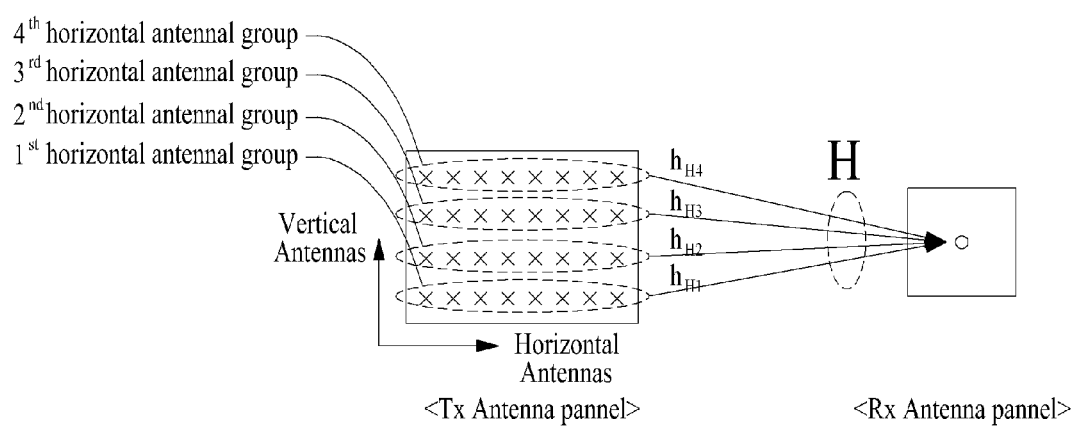
FIG. 10 is a view illustrating a massive antenna implemented using cross-pole antennas.

Furthermore, the aforementioned embodiments of the present invention can be applied to a case in which a massive antenna is implemented using a cross-pole antenna. FIG. 10 illustrates a massive antenna implemented using cross-pole antennas.

When a massive antenna is implemented as shown in FIG. 10, the aforementioned codebook structure according to the present invention can be modified and applied to the massive antenna. Specifically, each horizontal antenna group of the cross-pole antennas can be grouped into two groups each having the same polarization. That is, when the two groups determined based on polarization are defined as A and B, $h_{Hi}$ is divided into $h_{Hi}^A$ and $h_{Hi}^B$.

In general, densely arranged cross-polarization antennas have the ULA characteristic in an antenna group having the same polarization and a phase difference is present between the two groups A and B.

That is, when the phase difference is defined as $\tau$, $h_{Hi}^A$ and $e^{j\tau} h_{Hi}^B$ have a high correlation coefficient with a high probability and $h_{Hi}^A$ and $h_{Hi}^B$ have the linear phase increase characteristic. A size-Q codebook indicating the phase difference between the two polarization groups is represented by $C_4$, which can be defined as represented by Equation 17, in consideration of the aforementioned channel characteristic.

$$C_4 = \left\{ e^{j\frac{2\pi}{Q}}, e^{j\frac{2\pi \times 2}{Q}}, \ldots, e^{j\frac{2\pi \times (Q-1)}{Q}} \right\} \quad \text{[Equation 17]}$$

Equation 12 can be modified into Equation 18 by additionally using $C_4$. In Equation 18, $e^{j\tau_i}$ indicates the phase difference between the polarization groups A and B in the i-th horizontal antenna group and is defined as one of the codewords of $C_4$.

$$P = \begin{bmatrix} \overbrace{(\alpha_{i1} d_{k_1})^* \quad (\alpha_{i2} d_{k_2})^* \quad (\alpha_{i3} d_{k_3})^* \quad (\alpha_{i4} d_{k_4})^*}^{\text{Polarization group A}} & \overbrace{(e^{j\tau_1} \alpha_{i1} d_{k_1})^* \quad (e^{j\tau_2} \alpha_{i2} d_{k_2})^* \quad (e^{j\tau_3} \alpha_{i3} d_{k_3})^* \quad (e^{j\tau_4} \alpha_{i4} d_{k_4})^*}^{\text{Polarization group B}} \end{bmatrix}^* \quad \text{[Equation 18]}$$

Polarization groups A and B are also present in a vertical antenna group and have cross-pole antenna characteristics. Accordingly, it is desirable to generate a precoding matrix such that $e^{j\tau_i}$ has the same value for i in consideration of horizontal and vertical antenna characteristics. In this case, feedback overhead can be reduced.

Figure 11:
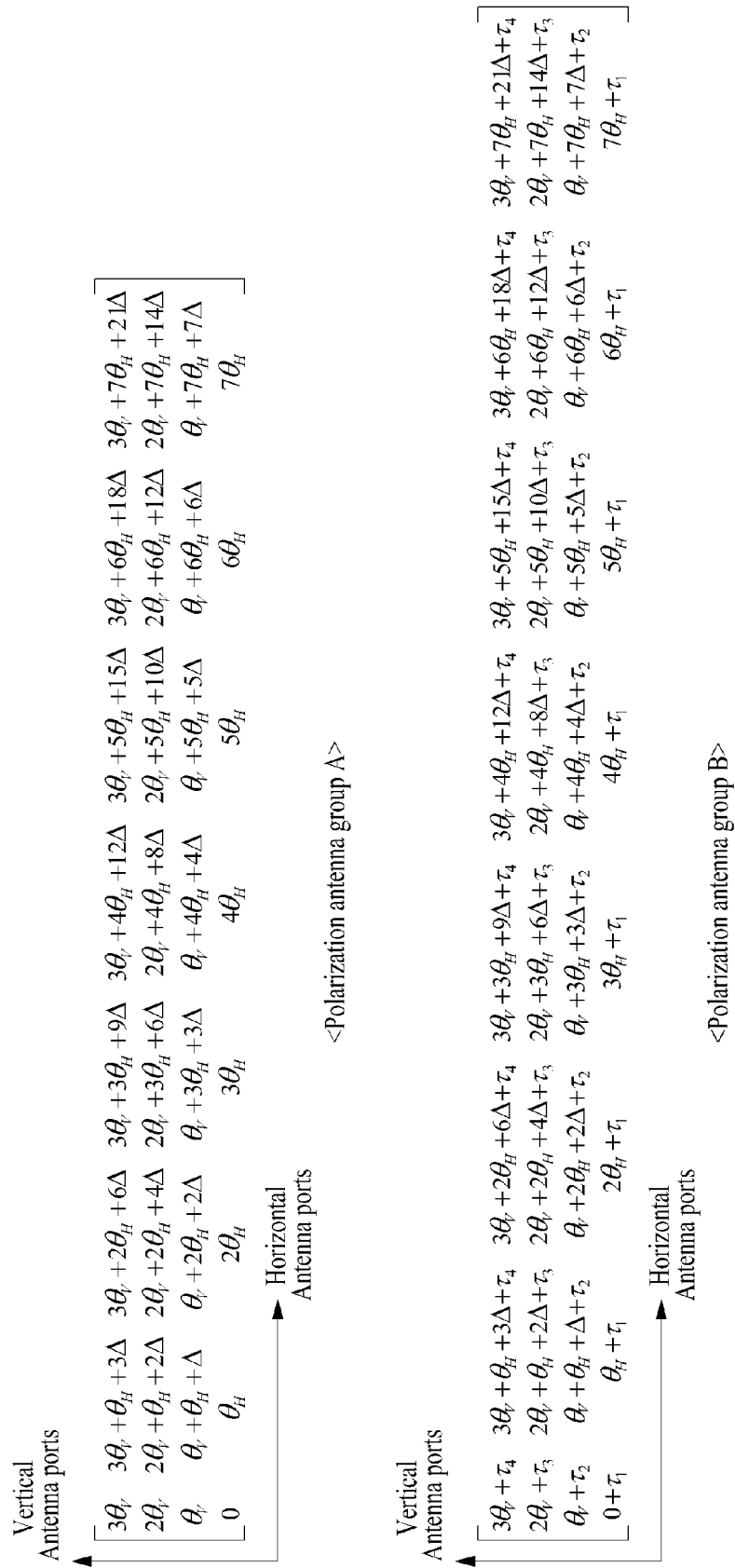
FIG. 11 is a view illustrating mapping only phase information of a precoding matrix which satisfies the linear phase increase characteristic to antenna ports in consideration of cross-pole antennas.

FIG. 11 illustrates mapping of only phase information of a precoding matrix to antenna ports when the precoding matrix is generated as shown in FIG. 18. Referring to FIG. 11, when $\tau_i$ has the same value for i, polarization antenna groups A and B have a phase difference of $\tau_i$ therebetween and thus cross-pole antenna characteristics are also applied in the vertical direction.

In addition, the method of indicating vertical linear phase increase using $C_3$, which is described above in the embodiments of the present invention for antennas having the same polarization, is also applicable. Furthermore, the UE can feed back two codewords selected from $C_2$ (or $C_2'$) and codewords respectively selected from $C_1$, $C_3$ and $C_4$ to the eNB even when cross-polarization antennas are used. Codewords of $C_1$, $C_2$ (or $C_2'$), $C_3$ and $C_4$ may be fed back in different periods.

When the massive antenna is constructed using cross-pole antennas, the aforementioned embodiment of the present invention can be applied even when a multi-rank precoding matrix is generated.

That is, a precoding matrix for rank 2 can be generated as represented by Equation 19.

$$P = \begin{bmatrix} \overbrace{(\alpha_{i1}d_{k_1})^* \quad (\alpha_{i2}d_{k_2})^* \quad (\alpha_{i3}d_{k_3})^* \quad (\alpha_{i4}d_{k_4})^*}^{\text{Polarization group A}} \quad \overbrace{(e^{j\tau_{11}}\alpha_{i1}d_{k_1})^* \quad (e^{j\tau_{12}}\alpha_{i2}d_{k_2})^* \quad (e^{j\tau_{13}}\alpha_{i3}d_{k_3})^* \quad (e^{j\tau_{14}}\alpha_{i4}d_{k_4})^*}^{\text{Polarization group B}} \\ (\alpha_{l1}d_{k_1})^* \quad (\alpha_{l2}d_{k_2})^* \quad (\alpha_{l3}d_{k_3})^* \quad (\alpha_{l4}d_{k_4})^* \quad (e^{j\tau_{21}}\alpha_{l1}d_{k_1})^* \quad (e^{j\tau_{22}}\alpha_{l2}d_{k_2})^* \quad (e^{j\tau_{23}}\alpha_{l3}d_{k_3})^* \quad (e^{j\tau_{24}}\alpha_{l4}d_{k_4})^* \end{bmatrix}^*$$

[Equation 19]

In equation 19, $e^{j\tau_{1i}}$ and $e^{j\tau_{2i}}$ respectively indicate a phase difference between polarization groups A and B in the i-th horizontal antenna group for the first rank and a phase difference between the two groups A and B for the second rank and are defined as one codeword of $C_4$. Accordingly, all phase differences between the polarization groups can be represented by the same value so as to reduce feedback overhead and phase differences between the polarization groups can be indicated in both horizontal and vertical directions, as described above.

That is, a precoding matrix which satisfies Equation 20 can be generated or, more simply, a precoding matrix which satisfies Equation 21 can be generated.

$$e^{j\tau_{11}} = e^{j\tau_{12}} = e^{j\tau_{13}} = e^{j\tau_{14}}, e^{j\tau_{21}} = e^{j\tau_{22}} = e^{j\tau_{23}} = e^{j\tau_{24}}$$ [Equation 20]

$$e^{j\tau_{11}} = e^{j\tau_{12}} = e^{j\tau_{13}} = e^{j\tau_{14}} = e^{j\tau_{21}} = e^{j\tau_{22}} = e^{j\tau_{23}} = e^{j\tau_{24}}$$ [Equation 21]

In all the aforementioned embodiment of the present invention, codebooks and rules applied to horizontal antennas and vertical antennas can be switched. That is, the codebook and the rule for the horizontal antennas can be applied to the vertical antennas and the codebook and the rule for the vertical antennas can be applied to the horizontal antennas to obtain the same effect.

In addition, different codeword feedback periods may be used in the aforementioned embodiments of the present invention. A description will be given of a method of feeding back codebooks (i.e. $C_1$ and $C_2$) generated for channels of horizontal antennas, a codebook (i.e. $C_3$) generated for channels of vertical antennas and a codebook (i.e. $C_4$) generated for a phase difference between polarization groups with different frequencies.

The UE needs to select codewords (i.e. PMIs in LTE) from the codebooks according to the aforementioned embodiments of the present invention on the basis of a channel estimated from a reference signal (RS) and to feed back the codewords to the eNB.

It is effective to feed back the selected codewords with different frequencies since the codebooks are set for different channel characteristics. That is, it is effective to feed back a codeword of a codebook, which is set for a relatively rapidly varying channel characteristic, with high frequency and to feed back a codeword of a codebook, which is set for a relatively slowly varying channel characteristic, with low frequency. For example, the codebook $C_4$, which indicates a phase difference between polarization groups, can be fed back with highest frequency and the codebook $C_3$, which is generated for vertical antennas, and the codebook $C_1$, which is generated for horizontal antennas, can be fed back with low frequency.

Figure 12:
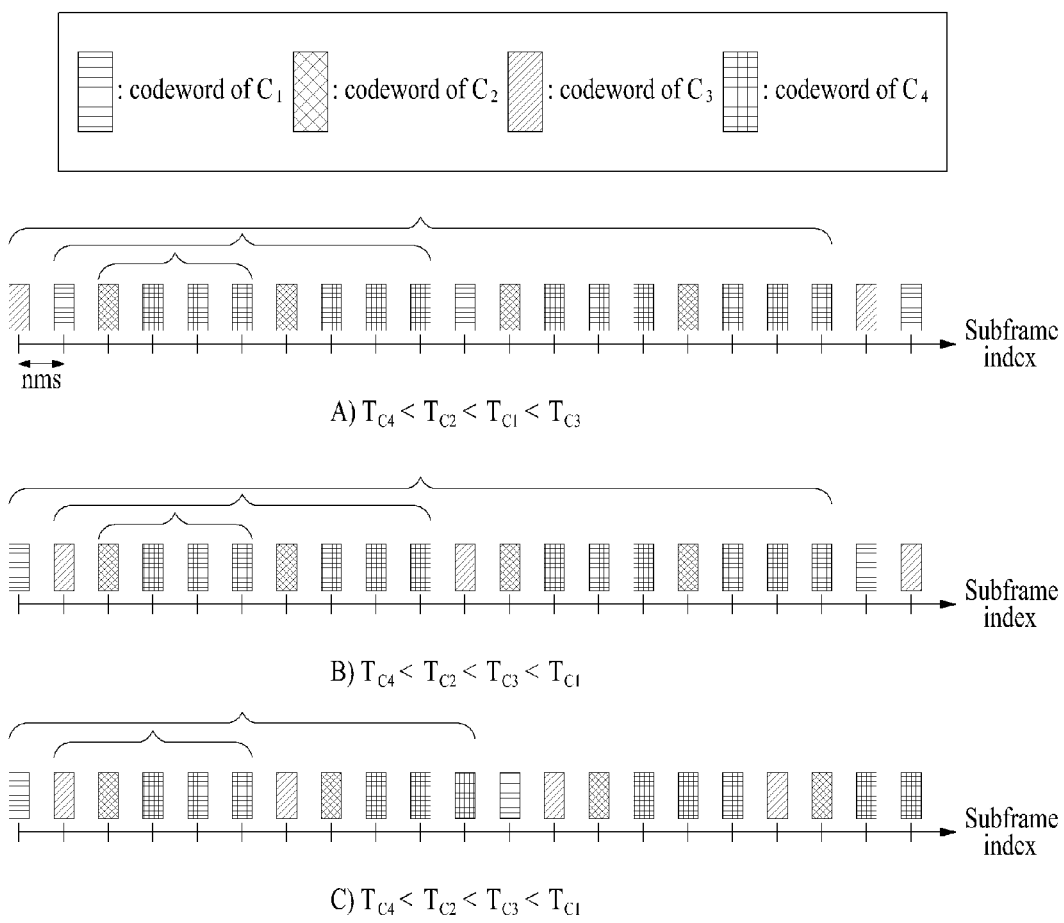
FIG. 12 is a view illustrating different codeword feedback periods.

FIG. 12 illustrates different codeword feedback periods. $T_{Ci}$ denotes a feedback period of a codeword of a codebook $C_i$. That is, the UE feeds back the codeword of $C_i$ with lower frequency as $T_{Ci}$ is larger.

In the case of A) of FIG. 12, a codeword of $C_4$ is fed back three times during one-time feed back of a codeword of $C_2$, the codeword of $C_2$ is fed back twice during one-time feed back of a codeword of $C_1$, and the codeword of $C_1$ is fed back twice during one-time feed back of a codeword of $C_3$.

In the case of B) of FIG. 12, the codeword of $C_4$ is fed back three times during one-time feed back of the codeword of $C_2$, the codeword of $C_2$ is fed back twice during one-time feed back of the codeword of $C_3$, and the codeword of $C_3$ is fed back twice during one-one feed back of the codeword of $C_1$.

In the case of C) of FIG. 12, the codeword of $C_4$ is fed back three times during one-time feed back of the codeword of $C_2$ and the codeword of $C_3$, and the codeword of $C_2$ and the codeword of $C_3$ are fed back twice during one-time feed back of the codeword of $C_1$.

When feedback frequencies of two codebooks are identical, codewords of the two codebooks can be simultaneously transmitted in the same subframe. When $T_{C4}=T_{C2}$ in A), B) and C) of FIG. 12, the codeword of $C_4$ is fed back once during one-time feedback of the codeword of $C_2$. While an RI, a CQI and the like are omitted in FIG. 12, the RI and CQI may be fed back along with a codeword in the same subframe as necessary.

In addition, the present invention can feed back part of information indicating a precoding matrix using a specific codeword.

For example, a precoding matrix can be represented by information $\theta_V$, $\theta_H$, $\Delta$ and $\tau_i$. Accordingly, the present invention can feed back $\theta_H$ and $\Delta$ using one codeword of $C_1$ and two codewords of $C_2$ or feed back $\theta_H$ using one codeword of $C_1$ and one codeword of $C_2$ and feed back $\Delta$ using one codeword of $C_2'$. Otherwise, the present invention may feed back $\theta_V$ using one codeword of $C_3$ and feed back $\tau_i$ using one codeword of $C_4$.

Furthermore, the present invention is not limited to the aforementioned embodiments and can be applied to any case in which $\theta_V$, $\theta_H$, $\Delta$ and $\tau_i$ are fed back using an arbitrary codebook representing $\theta_V$, $\theta_H$, $\Delta$ and $\tau_i$.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor.

The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method for generating a codebook in a wireless communication system and the apparatus for the same are applied to 3GPP LTE in the aforementioned embodiments, the method and apparatus can be applied to various wireless communication systems other than 3GPP LTE.

The invention claimed is:

1. A method for transmitting, by a transmitting end, a feedback using a codebook in a wireless communication system supporting a multi-dimensional antenna, the method comprising:
    determining a first codeword for a first horizontal antenna group and a second codeword for a second horizontal antenna group among a plurality of horizontal antenna groups, wherein each of the first and the second horizontal antenna groups includes a plurality of horizontal antennas having an identical vertical antenna port;
    determining a third codeword for each of antenna groups other than the first and second horizontal antenna groups, from among the plurality of horizontal antenna groups; and
    feeding back at least one of the first, second and third codewords to a receiving end,
    wherein the third codeword is configured to have a linear phase increment value corresponding to a difference between a first vertical antenna port index of the first horizontal antenna group and a second vertical antenna port index of the second horizontal antenna group.

2. The method according to claim 1, wherein the second codeword and the third codeword are determined from a precoding matrix corresponding to all channels between the multi-dimensional antenna and the receiving end.

3. The method according to claim 1, wherein the second codeword is selected from the first codebook selected for the plurality of horizontal antenna groups from a prestored codebook, and the third codeword is determined from a precoding matrix corresponding to all channels between the plurality of horizontal antenna groups and the receiving end.

4. The method according to claim 1, wherein the third codeword is a column vector matrix having an index determined by Equation A in a specific precoding matrix:

$$C_{3,index}=((j-1)+|i-j|) \bmod M+1, \text{ and} \qquad \text{[Equation A]}$$

wherein $C_{3,index}$ indicates a third codeword column index, i indicates a column vector index of the specific precoding matrix, the column vector index corresponding to the first codeword, j indicates a column vector index of the specific precoding matrix, the column vector index corresponding to the first codeword, mod denotes a modular operation and M indicates the number of column vectors of the specific precoding matrix.

5. The method according to claim 1, further comprising signaling a phase parameter,
    wherein the second codeword is determined by the phase parameter.

6. The method according to claim 5, wherein the second codeword is determined by Equation B:

$$C = \left\{ e^{j\frac{2\pi(q)}{RQ}} \middle| -Q \leq q \leq Q \right\}, \qquad \text{[Equation B]}$$

and
    wherein C indicates the second codeword, Q and q indicate predetermined phase parameters, and R denotes the signaled phase parameter.

7. The method according to claim 1, wherein the wireless communication system supports multiple ranks, and
    wherein third codewords for the multiple ranks are determined such that the third codewords are mutually orthogonal.

8. The method according to claim 1, wherein the first, second and third codewords are precoding matrix indices (PMIs).

9. The method according to claim 1, wherein the first, second and third codewords are independently fed back.

10. The method according to claim 9, wherein the first, second and third codewords are fed back in different periods.

11. The method according to claim 1, wherein the precoding matrix is composed of a discrete Fourier transform (DFT) vector.

12. A method for transmitting, by a transmitting end, a feedback using a codebook in a wireless communication system supporting a multi-dimensional cross-pole antenna, the method comprising:
    determining a first codeword for a first horizontal antenna group, from a first codebook including at least one precoding matrix and selected for a plurality of horizontal antenna groups from prestored codebooks;
    determining a second codeword for a second horizontal antenna group;
    determining a third codeword for each of antenna groups other than the first and second horizontal antenna groups, from among the plurality of horizontal antenna groups;
    determining a fourth codeword indicating a phase difference between a first polarization group and a second polarization group in the plurality of horizontal antenna groups; and
    feeding back at least one of the first, second, third and fourth codewords to a receiving end,
    wherein the first polarization group and the second polarization group have different polarizations, and the third codeword is determined according to a phase increment value determined on the basis of the first and second codewords.

13. The method according to claim 12, wherein the fourth codeword is determined by Equation C:

$$C_4 = \left\{ e^{j\frac{2\pi}{Q}}, e^{j\frac{2\pi \times 2}{Q}}, \ldots, e^{j\frac{2\pi \times (Q-1)}{Q}} \right\},$$ [Equation C]

and wherein $C_4$ indicates the fourth codeword, j denotes an integer and Q represents a predetermined phase parameter.

* * * * *